United States Patent [19]

Merkel et al.

[11] 3,967,361

[45] July 6, 1976

[54] PIN REMOVER AND INSTALLER

[75] Inventors: Russell Dwane Merkel, Coal City; William Edwin Lanz, Joliet, both of Ill.

[73] Assignee: Caterpillar Tractor Co., Peoria, Ill.

[22] Filed: June 9, 1975

[21] Appl. No.: 584,996

[52] U.S. Cl. .................................................. 29/267
[51] Int. Cl.[2] ........................................ B23P 19/04
[58] Field of Search ............................. 29/259, 267

[56] References Cited

UNITED STATES PATENTS

| | | | |
|---|---|---|---|
| 1,451,852 | 4/1923 | Verdoorn | 29/259 |
| 1,606,830 | 11/1926 | Finkel | 29/259 |
| 2,947,073 | 8/1960 | Boyer | 29/267 |
| 3,258,837 | 7/1966 | Smith | 29/259 |

*Primary Examiner*—James L. Jones, Jr.
*Attorney, Agent, or Firm*—Wegner, Stellman, McCord, Wiles & Wood

[57] ABSTRACT

A tool for removing a retaining pin from a tooth of a ground engaging tool assembly of the type in which the tooth has side walls defining a socket which receives a shank of a mounting member, and in which the retaining pin impales aligned holes in the tooth side walls and in a through bore of the shank and is secured by a split washer that is held in a cavity surrounding an end of the through bore and engages a circumferential groove in the pin. The tool includes a mounting element that embraces the tooth to align a stud with the pin, and force multiplying means for moving the stud effectively axially to slide the pin endwise out of engagement with the washer.

2 Claims, 5 Drawing Figures

Fig. 3
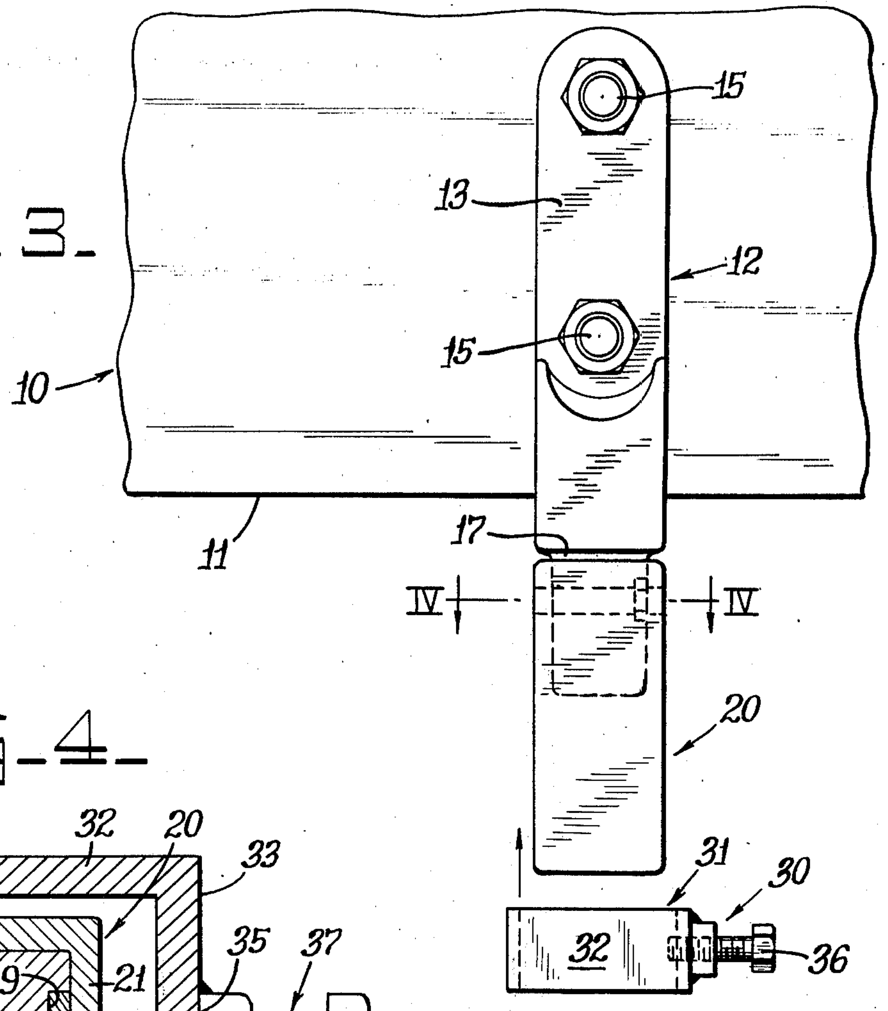
Fig. 4
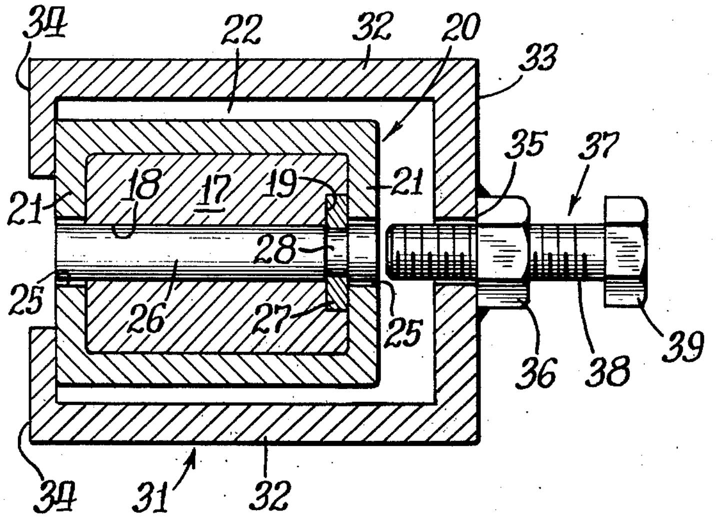
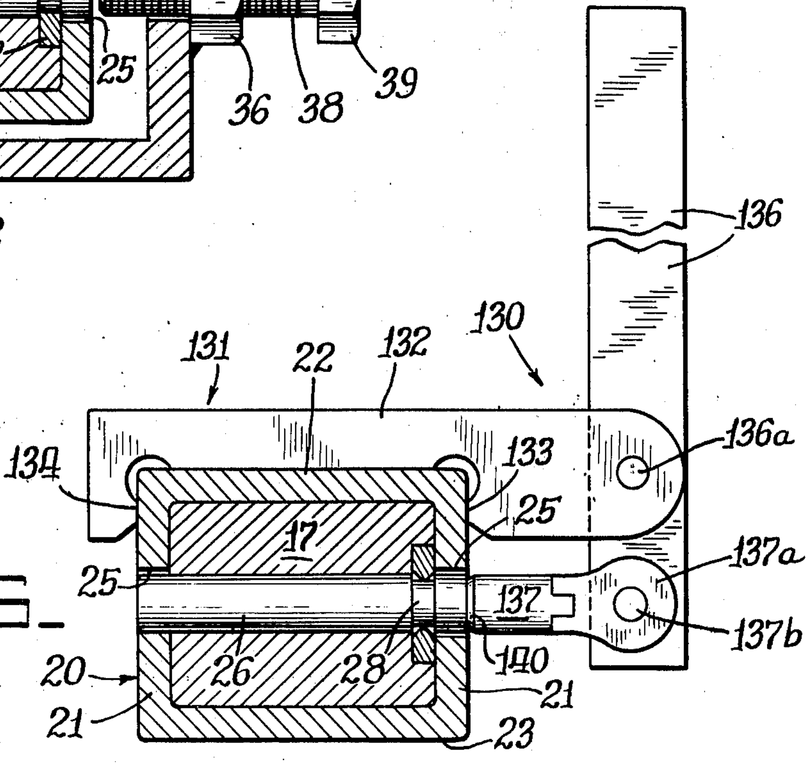
Fig. 5

PIN REMOVER AND INSTALLER

BACKGROUND OF THE INVENTION

Ground engaging tools such as earth loaders, excavators, scrapers and rippers are provided with teeth or ripper tips which are carried upon mounting stubs. In the case of equipment such as loaders and excavators, the stubs are integral parts of adapters of which a series are bolted in spaced relationship along the leading edge of the bucket; while in the case of rippers each ripper shank has a stub end which receives the ripper tip or tooth. Commonly, the teeth have parallel sidewalls which define two sides of a socket that receives the mounting stub, and holes in the sidewalls align with a transverse through bore in the stub to receive a retaining pin. Convenienty, the retaining pin is held in place by a split washer which is seated in a recess in one face of the stub surrounding an end of the through bore where it is held in place by abutment with the inner surface of the adjacent tooth sidewall, and the retaining pin has a circumferential groove in which the split washer engages to firmly lock the retaining pin in place.

The above described arrangement provides a very strong mounting for the tooth or ripper tip, but makes it difficult to mount the teeth or remove them for replacement because very substantial force must be applied to the retaining pin to free it from the split washer. There is no great problem during initial factory assembly, because hydraulic or pneumatic driving tools may be used to push the end portion of the pin through the washer until the washer snaps into the groove in the pin. Replacement of teeth in the field has presented difficult problems because of the lack of any suitable compact, manually operated tool which may be easily carried in a tool box of such a machine.

U.S. Pats. Nos. 2,546,457 and 3,106,256 disclose excavator teeth which are retained by means which make them readily removable by the use of a tool which is basically a specialized C-clamp; but it is quite apparent that such tools would be of no use for removing retaining pins of the type which are held by a split washer.

U.S. Pat. No. 3,711,928 discloses a hydraulically operated portable pin press which may be used to expel broken connector pins from the tracks of tracked vehicles; but it is not readily adaptable for use in the field.

SUMMARY OF THE INVENTION

The principal object of the invention is to provide a simple, compact and inexpensive hand operated tool which may be used to remove retaining pins from the teeth or tips of ground engaging tool assemblies.

Yet another object of the invention is to provide such a pin removing tool which is small enough to be readily carried as regular equipment in a tool box of an earth loader or the like.

Still another object of the invention is to provide such a tool which may be readily manually positioned upon a tooth, and which will maintain a desired mounted position while it is manually manipulated to drive the retaining pin out of the tooth.

Still another object of the invention is to provide such a tool which does not damage the retaining pin in removing or replacing it.

THE DRAWINGS

FIG. 3 is a fragmentary plan view of the front edge portion of an earth mover bucket with an adapter and tooth mounted thereon, and with a first embodiment of the tool of the present invention illustrated in position to be positioned on the tooth for pin removal;

FIG. 4 is a transverse sectional view on an enlarged scale taken substantially as indicated along the line IV—IV of FIG. 3 with the first embodiment of the invention in position to remove the retaining pin; and FIG. 5 is a sectional view like FIG. 4 illustrating a second embodiment of the invention.

DETAILED DESCRIPTION OF THE INVENTION

Figure 1:
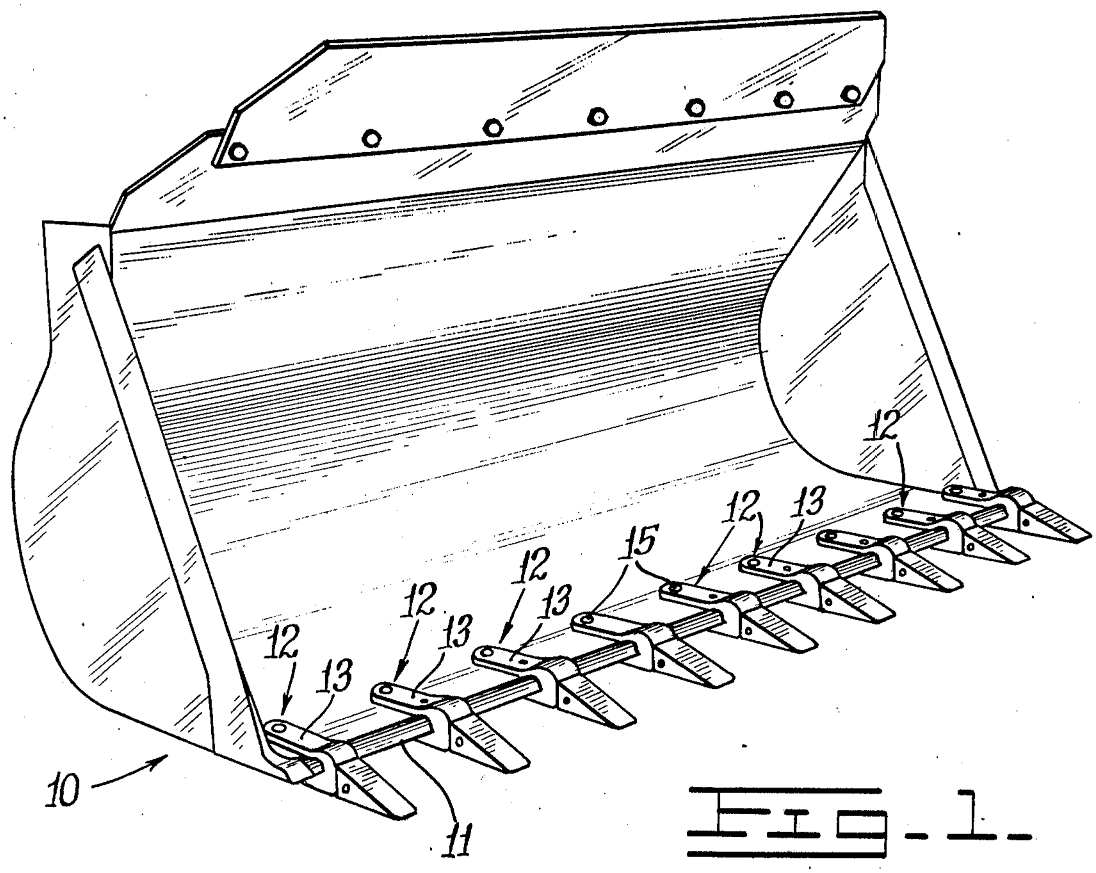
FIG. 1 is a perspective view of an earth mover bucket which is provided with a series of adapters and teeth.
Figure 2:
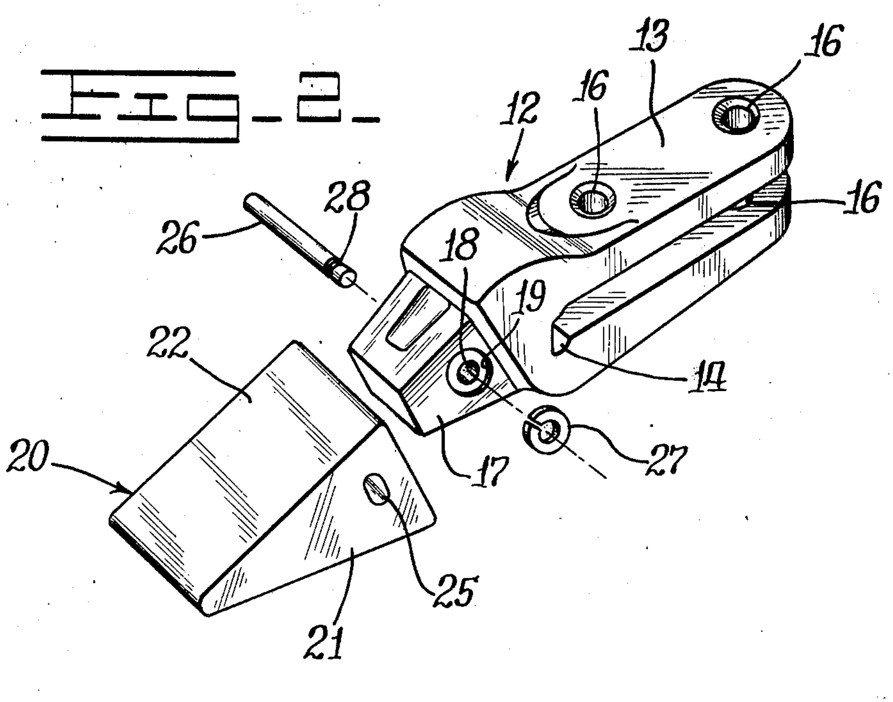
FIG. 2 is a perspective view of one adapter removed from a bucket with the tooth, pin and split washer illustrated in conjunction therewith.

As seen in FIGS. 1 to 3, an earth mover bucket, indicated generally at 10, has a forward edge 11 on which a series of adapters, indicated generally at 12, are mounted. Each adapter includes a bifurcated mounting portion 13 which receives the forward edge portion of the bucket so that the forward edge 11 seats in a recess 14, and each adapter is secured by bolts 15 which impale aligned holes 16 in the bifurcated mounting portions of the adapters and in the bucket. The adapter is seen in FIG. 2 to include a forwardly extending stub or shank 17 that is provided with a transverse through bore 18 one end of which is surrounded by a counterbore which forms a cavity 19.

A tooth or tip, indicated generally at 20, has parallel side walls 21 which, together with top and bottom walls 22 and 23, define a socket 24 in the rear of the tooth 20 which receives the shank 17 of the adapter 12. The sidewalls 21 of the tooth are provided with coaxial holes 25 which are aligned with the through bore 18 of the shank 17 when the tooth is properly mounted on the shank. A retaining pin 26 impales the through bore 18 and the aligned holes 25, and washer means, preferably a split washer 27 which seats in the cavity 19 of the shank 17 and which preferably engages a circumferential groove 28 in the pin to lock the pin in place.

The manual tool of the present invention has for its purpose the removal of the pin 26 by disengaging it from the washer 27, or the insertion of a pin 26 by engaging it with a washer 27.

Referring now to FIGS. 3 and 4, the first embodiment of the invention is indicated generally at 30, and is seen to include a mounting element, indicated generally at 31, that consists of parallel webs 32 connected by a flange 33, and parallel to the flange 33 at the opposite ends of the webs 32 are aligned flange elements 34 each of which may, for purposes of the present disclosure, be considered to be a flange. As seen in FIG. 4, the mounting element 31 is large enough to loosely embrace the tooth 20 in the plane of the retaining pin 26.

Formed in the flange 33 is a hole 35 which is seen to be substantially the same size as the holes 25 which loosely receive the end portions of the retaining pin 26, and a threaded nut 36 is welded to the flange 33 in register with the hole 35. A stud, indicated generally at 37, is provided with a thread 38 which screws into the thread of the nut 36, and the stud 37 also includes a hex head 39. The end 40 of the stud opposite the hex head is adapted to engage the end of the pin 26, as illustrated in FIG. 4, when the stud is rotated to move it axially toward the pin (to the left as seen in FIG. 4). Thus, the threaded nut 36 and the thread 38 on the stud 37 provide force multiplying means which movably support the stud in the flange 33 of the mounting element 31.

In use, the pin remover 30 is placed so that the mounting element 31 lossely embraces the tooth as seen in FIG. 4 with the flanges 34 bearing against one of the tooth sidewalls 21, and the threaded stud 37 is rotated in the nut until its pin engaging end 40 bears upon the pin. The pin remover will then remain in place and further rotation of the stud 37 may be carried out by means of a wrench or other hand tool which provides further force multiplying means for driving the pin 26 out of its engagement with the split washer 27.

When the tool 30 is to be used for mounting a pin, the pin is inserted through the left-hand hole 25 and the through bore 18 until its inner end abuts the split washer 19 which is held in the cavity 18 by abutment of the adjacent sidewalls 21 of the tooth. The tool 30 is then placed in a position embracing the tooth, but reversely with reference to its showing in FIG. 4 so that the pin engaging end 40 of the stud 37 bears against the projecting trailing end of the pin. The threaded stud may then be turned by means of a wrench or the like to force the inner end of the pin 26 through the split washer 27 until the latter snaps into place in the circumferential groove 28 of the pin.

Referring now to FIG. 5, a tool, indicated generally at 130, includes a mounting element, indicated generally at 131, which has a web 132 from one side of which parallel flanges 133 and 134 extend laterally to flank the sidewalls 21 of the tooth 20. In this embodiment, the flanges 133 and 134 closely embrace the sidewalls of the tooth and the web 132 bears against the top wall 22 so as to positively position the mounting element 131 on the tooth.

Motion multiplying means in the form of a first class lever 136 is pivotally mounted at 136*a* on the mounting element 131 outboard of the flange 133.

A stud 137 includes a fitting 137*a* which is pivotally mounted on one arm of the lever 136 by means of a pin 137*b*. The pivotal mounting of the stud 137 permits it to move effectively axially so that its pin engaging end 140 may contact the pin 26 and drive it free of the split washer 27.

The lever 136, together with the pins 136*a* and 137*a*, constitutes force multiplying means which movably supports the stud 137 on the mounting element 131 where the pin engaging end 140 of the stud 137 may abut the pin when the mounting element 131 embraces the tooth 20.

As in the case of the first embodiment of the invention, the second embodiment may be used to set a pin 26 in the tooth and the shank by reversing the position of the mounting element 131 from its location illustrated in FIG. 5 and using the stud 137 to bear upon the outwardly projecting end of the pin 26 and thus force the inner end of the pin through the washer 27 until the latter engages the pin groove 28.

The foregoing detailed description is given for clearness of understanding only and no unnecessary limitations should be understood therefrom, as modifications will be obvious to those skilled in the art.

What is claimed is:

1. A tool for removing or installing a retaining pin of an assembly which includes a supporting shank having a through bore, a member which has parallel side walls and transverse walls defining a socket to receive said shank with aligned holes in said side walls that register with the through bore when the member is properly mounted on the shank, a retaining pin which impales said through bore and aligned holes, and a retainer washer which seats in a cavity of the assembly and engages said pin, said tool comprising, in combination:

a mounting element which includes a web and means for securing said mounting element to the member with an end portion of said web spaced laterally outside the plane of one of the sidewalls, said means consisting of a pair of parallel, fixed flanges projecting from a side of said web, the space between said flanges being such that they closely embrace the sidewalls of the member to secure the web stably to said member, one of said flanges being at the end of the web remote from said end portion, and the other of said flanges being adjacent said end portion;

a lever pivoted on said end portion of the web for rotation in a plane normal to said sidewalls, said lever having an arm alongside said one of said sidewalls when said mounting element is secured to said member;

and a stud pivoted on said arm of the lever, said stud being in axial alignment with the retaining pin when the mounting element is secured to the member, said stud having a pin engaging end portion that is smaller in diameter than the holes in the sidewalls, said lever being constructed to provide manually operable force multiplying means by which the stud may be moved effectively axially to slide the retaining pin endwise and selectively engage or disengage the pin and the retainer washer.

2. The combination of claim 1 in which the lever is of the first class.

* * * * *